Patented Feb. 22, 1944

2,342,456

UNITED STATES PATENT OFFICE 2,342,456

COMPOSITION CONTAINING A SUBSTITUTED ALKYL HALIDE

Gaetano F. D'Alelio, Pittsfield, Mass., assignor to General Electric Company, a corporation of New York No Drawing. Application May 28, 1942, Serial No. 444,915

15 Claims. (Cl. 260—45)

This invention relates to the production of new materials and more particularly is concerned with new reaction products of particular utility in the plastics and coating arts and which contain, or are produced from, halogen compounds that may be represented by the following general formula:

I

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and substituted hydrocarbon radicals, more particularly halo-hydrocarbon radicals, and X represents a halogen atom, more particularly a chlorine, bromine, fluorine or iodine atom. Since $n$ represents an integer which is 1 or 2, it will be seen that the halogen atom represented by X in all cases will be alpha or beta to the carbamyl or thiocarbamyl grouping.

Illustrative examples of radicals that R in the above formula may represent are: aliphatic (e. g., methyl, ethyl, propyl, isopropyl, butyl, secondary butyl, isobutyl, amyl, isoamyl, hexyl, allyl, methallyl, ethallyl, crotyl, etc.), including cycloaliphatic (e. g., cyclopentyl, cyclopentenyl cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylpropyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chlorophenyl, chloromethyl, chloroethyl, fluorophenyl, iodophenyl, dichlorophenyl, chlorocyclohexyl, phenyl chloroethyl, bromoethyl, bromopropyl, etc. Preferably R in Formula I is hydrogen. However, there also may be used in carrying the present invention into effect chemical compounds such, for instance, as those represented by the formulas:

II $$HO-Y-NH-\overset{Z}{\underset{\|}{C}}-C_nH_{2n}X$$

and, more particularly,

III $$HO-Y-NH-\overset{O}{\underset{\|}{C}}-CH_2Cl$$

and

IV

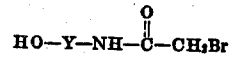

where $n$, Z, Y and X have the same meanings as given above with reference to Formula I.

Illustrative examples of divalent carbocyclic radicals that Y in Formulas I, II, III and IV may represent are: arylene, e. g., phenylene, xenylene, naphthylene, etc.; alkarylene, e. g., 1,4-tolylene, para-(2,3-xylylene), etc.; cycloalkylene, e. g., cyclopentylene, cyclohexylene, etc.; cycloalkenylene, e. g., cyclopentenylene, cyclohexenylene, etc.; and their homologues, as well as those divalent carbocyclic radicals with one or more of their hydrogen atoms replaced by a substituent, e. g., halogeno, amino, acetyl, acetoxy, carboalkoxy, alkoxy, aryloxy, alkyl, alkenyl, sulfamyl, a hydroxy group or groups in addition to the single hydroxy group shown in the above formulas, etc. Specific examples of substituted divalent carbocyclic radicals are chlorophenylene, bromophenylene, bromocyclopentylene, bromocyclopentenylene, acetophenylene, carbomethoxyphenylene, ethoxyphenylene, chlorocyclopentylene, aminophenylene, phenoxyphenylene, dihydroxyphenylene, methylphenylene (tolylene), allylphenylene, etc. Preferably Y is phenylene or methylphenylene.

The hydroxycarbocyclic-carbamyl alkyl halides used in carrying the present invention into effect may be produced in various ways. One suitable method comprises effecting reaction between a hydroxycarbocyclic amine and a halogeno aliphatic acyl halide in the presence of a hydrohalide acceptor and while admixed with a suitable solvent or mixture of solvents. A hydrohalide acceptor is desirable in order to promote an increased rate of reaction in the desired direction. The choice of the hydrohalide acceptor is largely dependent upon the particular solvent employed. When aqueous solvents are used, then it is preferable to use an alkali-metal hydroxide, e. g., sodium hydroxide or potassium hydroxide. When non-aqueous solvents are employed, the preferred acceptor is a tertiary amine, e. g., pyridine. Non-aqueous solvents, e. g., ether, acetone, benzene, etc., are preferred. The reaction generally is carried out at a relatively low temperature, e. g., at temperatures of the order of 0° to 30° C. The reaction may be represented by the following general equation:

V

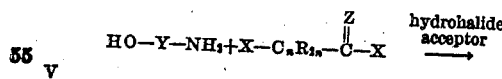

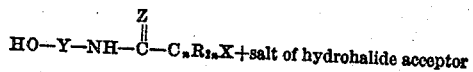

where $n$, Z, Y, R and X have the same meanings as given above with reference to Formula I.

Specific examples of hydroxycarbocyclic-carbamyl alkyl halides embraced by Formula I and which may be used in carrying the present invention into effect are listed below:

The hydroxyphenyl-carbamyl halogeno methanes, including the ortho-, meta- and para-hydroxyphenyl chloro methanes, the ortho-, meta- and para-hydroxyphenyl bromo methanes, the ortho-, meta- and para-hydroxyphenyl iodo methanes, the ortho-, meta- and para-hydroxyphenyl fluoro methanes The hydroxyphenyl-thiocarbamyl halogeno methanes The hydroxytolyl-carbamyl halogeno methanes The hydroxytolyl-thiocarbamyl halogeno methanes The hydroxynaphthyl-carbamyl halogeno methanes The hydroxynaphthyl-thiocarbamyl halogeno methanes The hydroxycyclohexyl-carbamyl halogeno methanes The hydroxycyclohexyl-thiocarbamyl halogeno methanes The alpha-(hydroxyphenyl-carbamyl) beta-chloro propanes The alpha-(hydroxyphenyl-carbamyl) beta-chloro propenes The alpha-(hydroxyphenyl-carbamyl) alpha-bromo butanes The alpha-(hydroxycyclohexyl-carbamyl) beta-chloro propanes The alpha-(hydroxycyclohexyl-carbamyl) alpha-chloro propanes The hydroxycyclopentyl-carbamyl chloro methanes The hydroxycyclopentyl-carbamyl phenyl chloro methanes The beta-(hydroxyphenyl-carbamyl) alpha-chloro butanes The (hydroxy bromophenyl)-carbamyl chloro methanes The (hydroxy chlorocyclohexyl)-carbamyl bromo methanes Alpha-(para-hydroxyphenyl-carbamyl) beta-iodo ethane Alpha-(ortho-hydroxyphenyl-carbamyl) beta-bromo ethane Alpha-(meta-hydroxyphenyl-carbamyl) beta-fluoro ethane Alpha-(para-hydroxyphenyl-thiocarbamyl) alpha-chloro ethane Alpha-(ortho-hydroxyphenyl-thiocarbamyl) alpha-bromo ethane Alpha-(meta-hydroxyphenyl-thiocarbamyl) alpha-iodo ethane The alpha-(hydroxyphenyl-carbamyl) alpha-chloro propanes The alpha-(hydroxyphenyl-thiocarbamyl) alpha-bromo butanes The alpha-(hydroxyphenyl-carbamyl) alpha-chloro pentanes The beta-(hydroxytolyl-carbamyl) alpha-chloro ethanes Beta-(ortho-hydroxyphenyl-carbamyl) alpha-chloro ethane Beta-(para-hydroxyphenyl-thiocarbamyl) alpha-bromo ethane Beta-(meta-hydroxyphenyl-carbamyl) alpha-iodo ethane Alpha-(4-hydroxy-naphthyl-[1]-carbamyl) beta-chloro butane Alpha-(para-hydroxy chlorophenyl-carbamyl) alpha-ethyl beta-phenyl beta-bromo ethane Para-hydroxytolyl-carbamyl cyclopentyl chloro methane Para-hydroxytolyl-carbamyl bromo methane Para-hydroxyphenyl-thiocarbamyl chloro methane The beta-(hydroxytolyl-carbamyl) alpha-chloro propanes 4-hydroxycyclohexyl-carbamyl chloro methane 3-hydroxycyclopentyl-carbamyl tolyl chloro methane Alpha-(para-hydroxyphenyl-thiocarbamyl) beta-chloro ethane Alpha-(ortho-hydroxyphenyl-carbamyl) alpha-chlorotolyl beta-bromo ethane Alpha-(para-hydroxyphenyl-carbamyl) alpha-(bromophenyl) beta-chloro ethane Alpha-(para-hydroxyphenyl-thiocarbamyl) alpha-naphthyl beta-chloro ethane Para-hydroxyphenyl-carbamyl xenyl chloro methane Alpha-(meta-hydroxytolyl-thiocarbamyl) beta-bromo ethane Alpha-(ortho-hydroxyphenyl-carbamyl) beta-bromo ethane Alpha-(meta-hydroxyphenyl-carbamyl) beta-fluoro methane Alpha-(para-hydroxyphenyl-carbamyl) alpha-chloro ethane The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and a halogenated compound of the kind embraced by Formula I, numerous examples of which have been given above. These new reaction products are not only valuable in themselves, but find particular utility when incorporated into an acid-curing thermosetting resin, for example acid-curing thermosetting phenoplasts and aminoplasts. For instance, I may add a soluble, fusible aldehyde-reaction product of the halogen compound to an acid-curing thermosetting resin and heat the resulting mixture. The aldehydic reaction product accelerates the conversion of the acid-curing thermosetting resin to an insoluble, infusible state. Or, I may cause the halogen compound itself to react with the acid-curing thermosetting resin and thus accelerate the curing of the resin. Or, I may form a rapidly curing resin by effecting reaction between ingredients comprising a halogen compound of the kind embraced by Formula I, an aldehyde, including polymeric aldehydes, hydroxyaldehydes and aldehyde-addition products, and a phenol (including phenol itself, cresols, xylenols, etc.) or an amino or amido compound (including imino and imido compounds), for instance aminodiazines, e. g., 2,4,6-triamino pyrimidine, 2,4,6-triureido pyrimidine, etc., aminotriazines, e. g., melamine, ammeline, ammelide, melem, melam, melon, triureido melamine, etc., aminotriazoles, e. g., guanazole, a urea, e. g., urea itself, thiourea, dicyandiamide, etc.

The resin syrups and molding compositions of this invention may be stored for long periods without material alteration. In marked contrast the prior acid-curing thermosetting resins, more particularly those containing direct or active curing catalysts such as organic or inorganic acids, e. g., hydrochloric, sulfuric, phosphoric, acetic, chloroacetic, phthalic, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In practicing the present invention the condensation between the reactants may be carried out under acid, alkaline or neutral conditions and at normal or at elevated temperatures. Any substance or catalyst which has an alkaline or an acid nature may be used to obtain the acid, alkaline or neutral condition, for example ammonia, sodium hydroxide, calcium hydroxide, methyl amine, diethyl amine, tributyl amine, ethanol amines, tri-isopropanol amine, etc.; mixtures of such alkaline substances; inorganic or organic acids such as sodium acid sulfate, monosodium phosphate, monosodium phthalate, etc.; basic salts such as ammonium carbonate, potassium carbonate, sodium acetate, etc.; or mixtures of such salts.

I may condense the components used in practicing this invention under various conditions. For example, all the components may be mixed together and the reaction caused to proceed under acid, alkaline or neutral conditions. Or, I may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiourea, etc., and an aldehyde), add the hereindescribed halogen compound thereto and effect further condensation. Or, I may first partially condense the halogen compound with a molecular excess of an aldehyde under acid, alkaline or neutral conditions, and then add thereto at least one other aldehyde-reactable organic compound, e. g., a phenol, a urea, aniline, etc., and effect further condensation. Also, I may separately partially condense a halogen compound of the kind embraced by Formula I and a different aldehyde-reactable organic compound with an aldehyde and then mix the two products of partial condensation and effect further condensation therebetween. The components of each reaction product may be initially condensed under acid, alkaline or neutral conditions at normal or at elevated temperatures.

Still other ways may be employed in combining the components and in producing the unmodified and modified condensation products of this invention, as readily will be understood by those skilled in the art as the description of the invention proceeds. These condensation reactions may be carried out under a wide variety of time, pressure and temperature conditions. The temperature of reaction may vary from room temperature to the reflux temperature of the reactants at reduced, atmospheric or superatmospheric pressures.

In order that those skilled in the art better may understand how the present invention may be carried into effect, the following illustrative examples thereof are given. All parts are by weight.

*Example 1*

| | Parts |
|---|---|
| Urea | 30.0 |
| Aqueous formaldehyde (approx. 37.1% HCHO) | 64.8 |
| Aqueous ammonia (approx. 28% NH$_3$) | 3.0 |
| Aqueous solution of sodium hydroxide (0.5 N) | 1.7 |
| Ortho - hydroxyphenyl - carbamyl chloro methane | 1.0 |

All of the above ingredients with the exception of the hydroxyphenyl-carbamyl chloro methane were heated together under reflux at the boiling temperature of the mass for 30 minutes. The halogen compound was now added and refluxing was continued for an additional 5 minutes to cause it to intercondense with the urea-formaldehyde partial condensation product. A molding (moldable) composition was made from the resulting clear, resinous syrup by mixing therewith 33.5 parts alpha cellulose in flock form and 0.2 part of a mold lubricant, specifically zinc stearate. The wet molding compound was dried at room temperature until sufficient moisture had been removed to provide a material that could be molded satisfactorily. A sample of the dried and ground molding compound was molded into the form of a disk, using a molding time of 5 minutes, a molding temperature of 140° C. and a molding pressure of 4,500 pounds per square inch. The disk was extracted hot from the mold and did not warp or become distorted upon cooling to room temperature. The molded disk was well cured and had a homogeneous and well-knit structure. It had very good resistance to water, as shown by the fact that it absorbed only 2.95% by weight of water when immersed in boiling water for 15 minutes followed by immersion in cold water for 5 minutes. The molding compound showed good plastic flow during molding as evidenced by the amount of flash on the molded piece.

*Example 2*

| | Parts |
|---|---|
| Melamine | 37.8 |
| Aqueous formaldehyde (approx. 37.1% HCHO) | 72.9 |
| Aqueous ammonia (approx. 28% NH$_3$) | 1.7 |
| Aqueous solution of sodium hydroxide (0.5 N) | 2.0 |
| Ortho-hydroxyphenyl-carbamyl chloro methane | 0.5 |

All of the above ingredients with the exception of the hydroxyphenyl-carbamyl chloro methane were heated together under reflux at the boiling temperature of the mass for 20 minutes, yielding a clear resinous syrup. A molding compound was prepared by mixing this syrup with 35 parts alpha cellulose, 0.2 part zinc stearate and the above-stated amount of ortho-hydroxyphenyl-carbamyl chloro methane. The wet molding compound was dried and molded as described under Example 1 with the exception that a molding time of 3½ minutes and a molding pressure of 5,000 pounds per square inch were used. The molded piece was well cured throughout and had a well-knit and homogeneous structure. It had excellent resistance to water when tested for its water-resistance characteristics as described under Example 1. The molding compound showed very good plastic flow during molding.

Example 3

| | Parts |
|---|---|
| Melamine | 37.8 |
| Thiourea | 22.8 |
| Aqueous formaldehyde (approx. 37.1% HCHO) | 121.5 |
| Aqueous ammonia (approx. 28% NH₃) | 4.0 |
| Aqueous solution of sodium hydroxide (0.5 N) | 3.0 |
| Para-hydroxyphenyl-carbamyl chloro methane | 1.5 |

All of the above ingredients with the exception of the para-hydroxyphenyl-carbamyl chloro methane were heated together under reflux at the boiling temperature of the mass for 20 minutes. The halogen compound was now added and refluxing was continued for an additional 5 minutes to cause it to intercondense with the melamine-thiourea-formaldehyde partial condensation product. The resulting resinous syrup was mixed with 63.5 parts alpha cellulose and 0.3 part zinc stearate to form a molding compound. The wet molding composition was dried as described under Example 1. A sample of the dried and ground molding compound was molded under pressure into the form of a disk, using a molding time of 5 minutes and a molding temperature of 140° C. A well-cured molded piece having a well-knit and homogeneous structure was obtained. It had excellent resistance to water as shown by the fact that it absorbed only 0.66% by weight of water when tested for its water-resistance characteristics as described under Example 1. The molding compound showed satisfactory flow characteristics during molding.

Example 4

| | Parts |
|---|---|
| Melamine | 37.8 |
| Para-amino benzene sulfonamide | 25.8 |
| Aqueous formaldehyde (approx. 37.1% HCHO) | 97.2 |
| Aqueous solution of sodium hydroxide (0.5 N) | 3.5 |
| Para-hydroxyphenyl-carbamyl chloro methane | 1.5 |

All of the above ingredients with the exception of the para-hydroxyphenyl-carbamyl chloro methane were heated together under reflux at the boiling temperature of the mass for 20 minutes. The halogen compound was now added and refluxing was continued for an additional 5 minutes. The resulting resinous syrup was mixed with 55.3 parts alpha cellulose and 0.3 part zinc stearate to form a molding compound. The wet molding composition was dried and molded as described under Example 1, yielding a well-cured molded piece that had a well-knit and homogeneous structure. It had excellent resistance to water as shown by the fact that it absorbed only 0.49% by weight of water when tested for its water-resistance characteristics as described under Example 1. The molding compound showed good flow characteristics during molding.

Example 5

| | Parts |
|---|---|
| Dimethylol urea | 40.5 |
| Trimethylol melamine | 64.8 |
| Aqueous ammonia (approx. 28% NH₃) | 7.0 |
| Aqueous solution of sodium hydroxide (0.5 N) | 3.0 |
| Ortho-hydroxyphenyl-carbamyl chloro methane | 2.0 |
| Water | 116.0 |

All of the above ingredients with the exception of the ortho-hydroxyphenyl-carbamyl chloro methane were heated together under reflux at boiling temperature for 20 minutes. Thereafter the halogen compound was added and refluxing was continued for an additional 3 minutes. The resulting resinous syrup was mixed with 77.8 parts alpha cellulose and 0.4 part zinc stearate to form a molding compound. The wet molding composition was dried and molded as described under Example 1. A well-cured molded piece having a well-knit and homogeneous structure was obtained. It absorbed only 0.55% by weight of water when tested for its water-resistance characteristics as described under Example 1. The molding compound showed good plastic flow during molding as evidenced by the amount of flash on the molded piece.

Example 6

| | Parts |
|---|---|
| 1-tolyl guanazole | 16.3 |
| Aqueous formaldehyde (approx. 37.1% HCHO) | 18.1 |
| Aqueous solution of sodium hydroxide (0.5 N) | 0.8 |
| Para-hydroxyphenyl-carbamyl chloro methane | 0.5 |

The above ingredients were mixed and heated at boiling temperature in an open reaction vessel for 1 minute, at the end of which period of time the reaction mass began to separate into two layers. The syrupy reaction product was mixed with 12 parts alpha cellulose and 0.1 part zinc stearate to form a molding compound. The wet molding composition was dried and molded as described under Example 1. A highly-cured, well-knit and homogeneous molded piece was obtained. It had excellent resistance to water when tested for its water-resistance characteristics as described under Example 1. The molding compound showed very good flow characteristics during molding.

Example 7

| | Parts |
|---|---|
| Bis-(diamino s-triazinyl thio acetamido) ethane | 30.0 |
| Aqueous formaldehyde (approx. 57.1% HCHO) | 48.6 |
| Aqueous ammonia (approx. 28% NH₃) | 2.5 |
| Aqueous solution of sodium hydroxide (0.5 N) | 2.0 |
| Ortho - hydroxyphenyl - carbamyl chloro methane | 1.0 |
| Water | 20.0 |

All of the above ingredients with the exception of the ortho-hydroxyphenyl-carbamyl chloro methane were heated together until the ingredients had dissolved. The halogen compound was now added and the mixture was heated under reflux at the boiling temperature of the mass for 20 minutes. The resulting resinous solution was mixed with 35 parts alpha cellulose and 0.2 part zinc stearate to form a molding compound. The wet molding composition was dried and molded as described under Example 1 with the exception that a molding time of 7 minutes was used. A well-cured molded piece having a well-knit and homogeneous structure was obtained. It had good resistance to water. The plasticity of the molding compound during molding was quite satisfactory, as indicated by the amount of flash on the molded piece.

Example 8

| | Parts |
|---|---|
| Urea | 30.0 |
| Soya bean protein | 5.0 |
| Aqueous formaldehyde (approx. 37.1% HCHO) | 72.9 |
| Aqueous ammonia (approx. 28% NH₃) | 2.5 |
| Aqueous solution of sodium hydroxide (0.5 N) | 3.0 |
| Ortho - hydroxyphenyl - carbamyl chloro methane | 1.0 | were heated together under reflux at the boiling temperature of the mass for 20 minutes. The resulting resinous syrup was mixed with 38.1 parts alpha cellulose and 0.2 part zinc stearate to form a molding compound. The wet molding composition was dried and molded as described under Example 1. A well-cured molded piece having a well-knit and homogeneous structure was obtained. It had good water resistance when tested for its water-resistance characteristics as described under Example 1. The plasticity of the molding compound during molding was very good.

Example 9

| | Parts |
|---|---|
| Ortho - hydroxyphenyl - carbamyl chloro methane | 18.5 |
| Aqueous formaldehyde (approx. 37.1% HCHO) | 50.0 | were heated together under reflux at the boiling temperature of the mass for 10 minutes, yielding a resinous reaction product that did not cure to an infusible state when a sample of it was heated on a 150° C. hot plate.

Instead of heating the reactants under reflux as above-described, the mixture may be shaken for a longer period, for example 24 to 72 hours or longer at room temperature (20–30° C.), to effect reaction between the components and to obtain a soluble, fusible reaction product.

Example 10

| | Parts |
|---|---|
| Para - hydroxyphenyl - carbamyl chloro methane | 18.5 |
| Aqueous formaldehyde (approx. 37.1% HCHO) | 90.0 | were heated together under reflux at the boiling temperature of the mass, yielding a resinous reaction product having approximately the same characteristics as the product of Example 9 when tested on a 150° C. hot plate.

If desired, reaction between the components may be effected by shaking the mixture for 24 to 72 hours or longer at room temperature instead of heating under reflux for 10 minutes as above-described.

Example 11

A phenol-formaldehyde partial condensation product was prepared by heating together the following components, with constant agitation, for 2½ hours at approximately 85–90° C.:

| | Parts |
|---|---|
| Phenol (freshly distilled) | 180.0 |
| Aqueous formaldehyde (approx. 37.1% HCHO) | 390.0 |
| Sodium carbonate (anhydrous) | 4.4 |

Due to a slight exothermic reaction the temperature rose for a brief period to 96° C. The resinous syrup produced in this manner is identified in the following formula as "syrupy phenolic resin":

| | Parts |
|---|---|
| Syrupy phenolic resin | 30.0 |
| Ortho - hydroxyphenyl - carbamyl chloro methane | 1.16 |
| Glycerine | 2.0 |

The phenolic resin, which initially was dark red in color, became lighter in color as the halogen compound lowered the pH of the solution. The reaction mixture was heated slowly under reduced pressure (55 mm. mercury) until an internal resin temperature of 60° C. was reached. The resulting molasses-like liquid resin was poured into a container and heated therein for 48 hours at 70° C. The resin cured to an insoluble and infusible state. The solidified resin was hard, smooth, homogeneous, fairly light in color and opaque. This latter characteristic was due mainly to the fact that the liquid casting resin had been insufficiently dehydrated. The solid resin was clear in its upper portion where the water could escape.

Example 12

| | Parts |
|---|---|
| Syrupy phenolic resin of Example 11 | 30.0 |
| Para - hydroxyphenyl - carbamyl chloro methane | 1.16 |
| Glycerine | 2.0 |

The same procedure was followed as described under Example 11, yielding an insoluble and infusible resin having approximately the same characteristics as the corresponding product of Example 11.

Example 13

| | Parts |
|---|---|
| Urea | 30.0 |
| Aqueous formaldehyde (approx. 37.1% HCHO) | 67.0 |
| Aqueous ammonia (approx. 28% NH₃) | 3.5 |
| Aqueous solution of sodium hydroxide (0.5 N) | 1.6 | were heated together under reflux at the boiling temperature of the mass for 20 minutes, yielding a resinous syrup that is identified in the following formula as "urea-formaldehyde syrup":

| | Parts |
|---|---|
| Urea-formaldehyde syrup | 102.0 |
| Reaction product of Example 9 | 7.3 |

These components were heated together under reflux at the boiling temperature of the mass for 5 minutes. The resulting resinous syrup was mixed with 34 parts alpha cellulose and 0.2 part zinc stearate to form a molding compound. The wet molding composition was dried and molded as described under Example 1 with the exception that a molding pressure of 10,000 pounds per square inch was used. A well-cured molded piece was obtained. It absorbed only 4.1% by weight of water when tested for its water-resistance characteristics as described under Example 1.

Example 14

| | Parts |
|---|---|
| Urea-formaldehyde syrup of Example 13 | 102.0 |
| Reaction product of Example 10 | 12.0 | were heated together under reflux at the boiling temperature of the mass for 6 minutes. A molding compound was prepared from the resulting resinous syrup as described under Example 13. The wet molding composition was dried and molded as described under Example 1 with the exception that a molding time of 3 minutes and a molding pressure of 10,000 pounds per square inch were used. The molded piece was adequately cured and showed somewhat better cohesive characteristics and evenness of structure than the molded product of Example 13. The plasticity of the molding compound during molding was very good, being slightly better than that of the molding compound of Example 13.

*Example 15*

| | Parts |
|---|---|
| Melamine | 32.0 |
| Aqueous formaldehyde (approx. 37.1% HCHO) | 61.0 |
| Aqueous ammonia (approx. 28% NH₃) | 1.5 |
| Aqueous solution of sodium hydroxide (0.5 N) | 1.25 | were heated together under reflux at the boiling temperature of the mass for 15 minutes, yielding a resinous syrup that is identified in the following formula as "melamine-formaldehyde syrup":

| | Parts |
|---|---|
| Melamine-formaldehyde syrup | 96.0 |
| Reaction product of Example 9 | 3.7 |

These components were heated together at the boiling temperature of the mass for 8 minutes. A molding compound was prepared by mixing 32 parts alpha cellulose and 0.2 part zinc stearate with the resulting resinous syrup. The wet molding composition was dried and molded as described under Example 1 with the exception that a molding time of 3 minutes and a molding pressure of 8,000 pounds per square inch were used. A well-cured molded piece having a well-knit and homogeneous structure was obtained. It had excellent resistance to water as shown by the fact that it absorbed only 0.63% by weight of water when tested for its water-resistance characteristics as described under Example 1. The plasticity of the molding compound during molding was slightly better than that of the molding compound of Example 13 but was not quite so good as that of the molding composition of Example 14.

*Example 16*

| | Parts |
|---|---|
| Melamine-formaldehyde syrup of Example 15 | 96.0 |
| Reaction product of Example 10 | 5.8 | were heated together under reflux at the boiling temperature of the mass for 7 minutes. A molding composition was made from the resulting resinous syrup as described under Example 15. The wet molding compound was dried and molded as described under Example 1 with the exception that a molding temperature of 135° C. and a molding pressure of 8,000 pounds per square inch were used. The molded piece was well cured and had a well-knit and homogeneous structure. The cohesive characteristics of the molded product were slightly better than that of the corresponding product of Example 15. The molded article absorbed only 1.1% by weight of water when tested for its water-resistance characteristics as described under Example 1. The plasticity of the molding compound during molding was very good, being slightly better than that of the molding compound of Example 15.

*Example 17*

| | Parts |
|---|---|
| Dimethylol urea (commercial grade containing approx. 11% by weight of water) | 60.0 |
| Aqueous ammonia (approx. 28% NH₃) | 3.5 |
| Aqueous solution of sodium hydroxide (0.5 N) | 1.6 |
| Water | 42.0 | were heated together under reflux at the boiling temperature of the mass for 20 minutes, yielding a resinous syrup that is identified in the following formula as "dimethylol urea syrup":

| | Parts |
|---|---|
| Dimethylol urea syrup | 107.0 |
| Reaction product of Example 9 | 7.3 | where heated together under reflux at the boiling temperature of the mass for 8 minutes. A molding compound was prepared from the resulting syrup by mixing therewith 36 parts alpha cellulose and 0.2 part zinc stearate. The wet molding composition was dried and molded as described under Example 1 with the exception that a molding time of 7 minutes and a molding pressure of 6,750 pounds per square inch were used. A well-cured molded piece was obtained. The plasticity of the molding compound during molding was approximately the same as that of the molding compound of Example 13.

*Example 18*

| | Parts |
|---|---|
| Dimethylol urea syrup of Example 17 | 107.0 |
| Reaction product of Example 10 | 12.0 | were heated together under reflux at the boiling temperature of the mass for 9 minutes. A molding compound was prepared from the resulting resinous syrup as described under Example 17. The wet molding composition was dried and molded as described under Example 1 with the exception that a molding time of 3 minutes, a molding temperature of 135° C. and a molding pressure of 8,000 pounds per square inch were used. A well-molded piece having a well-knit and homogeneous structure was obtained. The plasticity of the molding compound during molding was slightly better than that of the molding compounds of Examples 13 and 17, being approximately the same as that of the molding compound of Example 15.

*Example 19*

| | Parts |
|---|---|
| Trimethylol melamine (crystalline) | 43.0 |
| Aqueous ammonia (approx. 28% NH₃) | 1.2 |
| Aqueous solution of sodium hydroxide (0.5 N) | 1.0 |
| Water | 30.4 | were heated together under reflux at the boiling temperature of the mass for 5 minutes, yielding a resinous syrup that is identified in the following formula as "trimethylol melamine syrup":

| | Parts |
|---|---|
| Trimethylol melamine syrup | 76.0 |
| Reaction product of Example 9 | 3.7 |

These ingredients were heated together in an open reaction vessel at the boiling temperature of the mass for 4 minutes. The resulting resinous syrup was mixed with 25 parts alpha cellulose and 0.1 part zinc stearate to form a molding compound. The wet molding composition was dried and molded as described under Example 1 with the exception that a molding pressure of 6,750 pounds per square inch was used. A well-cured molded piece having a well-knit and homogeneous structure was obtained. It had excellent resistance to water as shown by the fact that it absorbed only 0.36% by weight of water when tested for its water-resistance characteristics as described under Example 1. The plasticity of the molding compound during molding was adequate, but was not quite so good as that of the molding compounds of Examples 13 to 18, inclusive.

Example 20

| | Parts |
|---|---|
| Trimethylol melamine syrup of Example 19 | 76.0 |
| Reaction product of Example 10 | 5.8 | were heated together under reflux at the boiling temperature of the mass for 4 minutes. A molding compound was prepared from the resulting resinous syrup as described under Example 19. The wet molding composition was dried and molded as described under Example 1 with the exception that a molding time of 3 minutes and a molding pressure of 10,000 pounds per square inch were used. The molded piece was well cured and had a well-knit and homogeneous structure. The plasticity of the molding compound during molding was better than that of the molding compound of Example 19, being approximately the same as that of the molding compounds of Examples 15 and 18. The molded article absorbed only 0.50% by weight of water when tested for its water-resistance characteristics as described under Example 1.

Example 21

| | Parts |
|---|---|
| 1-phenyl guanazole | 35.0 |
| Aqueous formaldehyde (approx. 37.1% HCHO) | 32.4 |
| Aqueous solution of sodium hydroxide (0.5 N) | 0.8 |
| Aqueous ammonia (approx. 28% NH₃) | 1.2 |
| Reaction product of Example 9 | 7.3 | were heated together in an open reaction vessel for 4 minutes, at the end of which period of time separation of a resinous mass took place. The reaction product was mixed with 23 parts alpha cellulose and 0.1 part zinc stearate to form a molding compound. The wet molding composition was dried and molded as described under Example 1 with the exception that a molding pressure of 8,000 pounds per square inch was used. The molded piece was well cured throughout and had a well-knit and homogeneous structure. It absorbed only 1.89% by weight of water when tested for its water-resistance characteristics as described under Example 1. The plasticity of the molding compound during molding was excellent, being somewhat better than that of the molding compounds of Examples 13 to 20, inclusive.

Example 22

Same as Example 21 with the exception that 12 parts of the reaction product of Example 10 were used. When the reactants were heated together in an open reaction vessel at boiling temperature for 8 minutes, a resinous mass was obtained.

It will be understood, of course, by those skilled in the art that the reaction between the components may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples under reflux at boiling temperature as mentioned in the individual examples, the reaction between the components may be carried out at temperatures ranging, for example, from room temperature up to the boiling temperature of the mass using substantially longer reaction periods.

It also will be understood by those skilled in the art that my invention is not limited to condensation products obtained by reaction between ingredients comprising an aldehyde and the specific halogen compound named in the above illustrative examples. Thus, instead of using a hydroxyaryl-carbamyl halogeno methane such as ortho-hydroxyphenyl-carbamyl chloro methane or para-hydroxyphenyl-carbamyl chloro methane, I may use, for example, meta-hydroxyphenyl-carbamyl chloro methane, an ortho-, meta or para-hydroxyphenyl-carbamyl bromo methane, an ortho-, meta- or para-hydroxyphenyl-carbamyl iodo methane, an ortho-, meta- or para-hydroxyphenyl-carbamyl fluoro methane, an ortho-, meta- or para-hydroxyphenyl-thiocarbamyl halogeno methane, a hydroxytolyl-carbamyl chloro, bromo, iodo or fluoro methane or any other halogen compound (or mixture thereof) embraced by Formula I, numerous examples of which have been given hereinbefore.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, heptaldehyde, octaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-methylol derivatives of urea, thiourea, selenourea and iminourea (numerous examples of which are given in my copending application Serial No. 377,524, filed February 5, 1941), mono- and poly-(N-carbinol) derivatives of amides of poly-carboxylic acids, e. g., maleic, fumaric, adipic, malonic, succinic, citric, phthalic, etc., mono- and poly-(N-carbinol) derivatives of the aminotriazines, of the aminotriazoles, etc. Particularly good results are obtained with active methylene-containing bodies such as a methylol urea, more particularly mono- and di-methylol ureas, and a methylol aminotriazine, more particularly a methylol melamine, including mono-methylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the halogen compound may be varied over a wide range depending upon the particular properties desired in the final product and the particular halogen compound used as a starting reactant. Thus, I may use, for example, from 0.5 to 4 or 5 or more mols of an aldehyde for each mol of the halogen compound. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example from 1 to 8 or 9 or more mols of such alkylol derivative for each mol of the halogen compound.

When the halogen compound of the kind embraced by Formula I is used primarily as an intercondensable curing reactant for accelerating the conversion of acid-curing thermosetting resins to an insoluble, infusible state, only a relatively small amount of the halogen compound ordinarily is required, for example an amount corresponding to from 0.2 or 0.3% to 5 or 6% by weight of the resin to be cured, calculated on the basis of the dry resin. In some cases it may be desirable to use higher amounts, for instance up to 8 or 9 or more parts by weight of the halogen compound per 100 parts (net dry) of the acid-curing thermosetting resin. When the halogen compound of the kind embraced by Formula I is incorporated into the acid-curing thermosetting resin in the form of a soluble, fusible aldehyde-reaction product thereof, then higher amounts of such reaction product ordinarily are used as compared with the amount employed when using the halogen compound itself. The halogen compound or its soluble, fusible reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the halogen compounds herein described or by their soluble, fusible aldehyde-reaction products, are the acid-curing phenol-aldehyde resins, aminotriazine-aldehyde resins (e. g., melamine-formaldehyde resins), aminotriazole-aldehyde resins, aminodiazine-aldehyde resins, urea-aldehyde resins (e. g., urea-formaldehyde resins), urea-aminotriazine-aldehyde resins (e. g., urea-melamine-formaldehyde resins), protein-aldehyde resins (e. g., casein-formaldehyde resins), aniline-aldehyde resins, resinous condensation products of aldehydes such as formaldehyde with polyamides as, for instance, malonic diamide, maleic diamide, fumaric diamide, itaconic diamide, etc. Other examples of amino or amido compounds (amidogen compounds) that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoyl urea, phenyl thiourea, asymmetrical diethyl urea, allyl urea, 2-chloroallyl urea, ethylidene urea, guanyl urea, biguanidine, aminoguanidine, melamine, triureido melamine, ammeline, ammelide, melem, melam, melon, aminodiazines, aminotriazoles, etc. Suitable mixtures of such compounds also may be used.

Phenol itself and various substituted phenols, for example the cresols, the xylenols, etc., may be condensed with aldehydes, e. g., formaldehyde, furfural, mixtures of formaldehyde and furfural, etc., to form acid-curing thermosetting resins of the phenolplast type, and these thermosetting resins then can be cured to the insoluble and infusible state with the aid of the hereindescribed halogen compounds or with the soluble, fusible aldehyde-reaction products thereof.

If desired, the fundamental reaction products of this invention may be modified by introducing other bodies before, during or after condensation between the primary components. Numerous examples of modifying agents that may be employed are given, for instance, in D'Alelio and Holmes Patent No. 2,265,688, issued December 9, 1941, page 3, column 2, lines 53–75, page 4, column 1, lines 1–40, which patent is assigned to the same assignee as the present invention.

Thermosetting molding compositions comprising a filler and an acid-curing thermosetting resin carrying a curing agent comprising a halogen compound of the kind described herein, or a soluble, fusible aldehyde-reaction product of such a halogen compound, may be molded into a variety of shapes under heat and pressure, more particularly at temperatures of the order of 100° to 200° C., preferably from approximately 120° to 180° C. The molding compositions show good plastic flow during molding since the curing agent not only functions as such but also generally serves to impart improved plastic flow to the molding composition. Molded articles of manufacture comprising the molded, heat-hardened molding compositions of this invention have a good surface finish, show no evidence of "bleeding" the curing agent, are well cured throughout, and show no loss in any of their other useful properties due to the presence of the hereindescribed halogen compound or aldehyde-reaction product thereof.

What I claim as new and desire to secure by Letters Patent of the United States is:

1. A composition comprising an acid-curing, thermo-setting resin carrying a curing agent therefor comprising a compound selected from the class consisting of (1) compounds corresponding to the general formula

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halohydrocarbon radicals, and X represents a halogen atom; and (2) soluble, fusible aldehyde-reaction products of the compounds of (1).

2. A composition comprising an acid-curing, thermosetting, phenol-aldehyde resin having incorporated therein a compound corresponding to the general formula

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halohydrocarbon radicals, and X represents a halogen atom.

3. A composition comprising an acid-curing, thermosetting, amidogen-aldehyde resin having incorporated therein a compound corresponding to the general formula

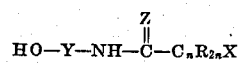

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halohydrocarbon radicals, and X represents a halogen atom.

4. A composition comprising the product of reaction of ingredients comprising a phenol, an aldehyde and a compound corresponding to the general formula

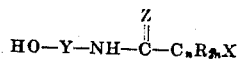

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halohydrocarbon radicals, and X represents a halogen atom.

5. A composition comprising the product of reaction of ingredients comprising a urea, an aldehyde and a compound corresponding to the general formula

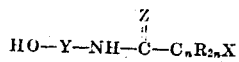

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halohydrocarbon radicals, and X represents a halogen atom.

6. A composition comprising the product of reaction of ingredients comprising an aminotriazine, an aldehyde and a compound corresponding to the general formula

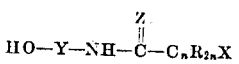

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halohydrocarbon radicals, and X represents a halogen atom.

7. A heat-curable resinous condensation product of ingredients comprising urea, formaldehyde and a compound represented by the general formula

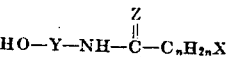

where $n$ represents an integer and is at least 1 and not more than 2, Z represents a member of the class consisting of oxygen and sulfur, Y represents a divalent carbocyclic radical and X represents a halogen atom.

8. A product comprising the cured resinous condensation product of claim 7.

9. A composition comprising the resinous product of reaction of ingredients comprising melamine, formaldehyde and a compound represented by the general formula

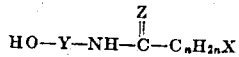

where $n$ represents an integer and is at least 1 and not more than 2, Z represents a member of the class consisting of oxygen and sulfur, Y represents a divalent carbocyclic radical and X represents a halogen atom.

10. A composition comprising the resinous product of reaction of (1) a partial condensation product of ingredients comprising a phenol and an aldehyde, and (2) a hydroxycarbocyclic-carbamyl chloro methane.

11. A composition comprising the resinous product of reaction of (1) a partial condensation product of ingredients comprising a urea and an aldehyde, and (2) a hydroxycarbocyclic-carbamyl chloro methane.

12. A resinous composition comprising the product of reaction of (1) a partial condensation product obtained by reaction, while admixed with an alkaline substance, of ingredients comprising urea and formaldehyde, and (2) a hydroxyphenyl-carbamyl chloro methane.

13. A composition comprising the resinous product of reaction of (1) a partial condensation product obtained by reaction, while admixed with an alkaline substance, of ingredients comprising urea and formaldehyde, and (2) a hydroxytolyl-carbamyl chloro methane.

14. A thermosetting molding composition comprising a filler and an acid-curing partial condensation product of ingredients comprising urea and formaldehyde, said condensation product having incorporated therein a small amount of a curing agent comprising a hydroxyphenyl-carbamyl chloro methane.

15. The method which comprises effecting partial reaction between ingredients comprising urea and formaldehyde under alkaline conditions, adding to the resulting partial condensation product a small amount of a hydroxyphenyl-carbamyl chloro methane, and causing the said chloro methane to intercondense with the said partial condensation product.

GAETANO F. D'ALELIO.